United States Patent

Ward

[15] 3,694,755

[45] Sept. 26, 1972

[54] BATTERY ECONOMY APPARATUS

[72] Inventor: Michael Henry Evans Ward, Radio Works, St. Andrews Road, Cambridge, England

[22] Filed: Nov. 13, 1970

[21] Appl. No.: 89,280

[30] Foreign Application Priority Data

Nov. 27, 1969 Great Britain.........58147/69

[52] U.S. Cl. ....................325/392, 325/466, 325/492

[51] Int. Cl. ..............................................H04b 1/06

[58] Field of Search......325/390, 391, 392, 393, 395, 325/466, 492

[56] References Cited

UNITED STATES PATENTS

| | | | |
|---|---|---|---|
| 2,912,574 | 11/1959 | Gensel | 325/492 |
| 2,523,315 | 9/1950 | Mayle | 325/392 |
| 3,488,596 | 1/1970 | Webster et al | 325/492 |
| 3,372,338 | 3/1968 | Kubota et al. | 325/492 |

*Primary Examiner*—Robert L. Griffin
*Assistant Examiner*—Peter M. Pecori
*Attorney*—Holcombe, Wetherill & Brisebois

[57] ABSTRACT

A radio receiver having an economizer circuit of the type in which the current path from a supply battery to the major parts of the receiver is periodically switched so that it is interrupted during idle periods of the receiver and having a decoder for a selective calling system, in which the delay in reversion to periodic switching of the economizer circuit is utilized to hold the said current path conductive during the reception of one or more tones of a selective calling sequence subsequent to the reception of a first tone.

13 Claims, 5 Drawing Figures

Figure 4:
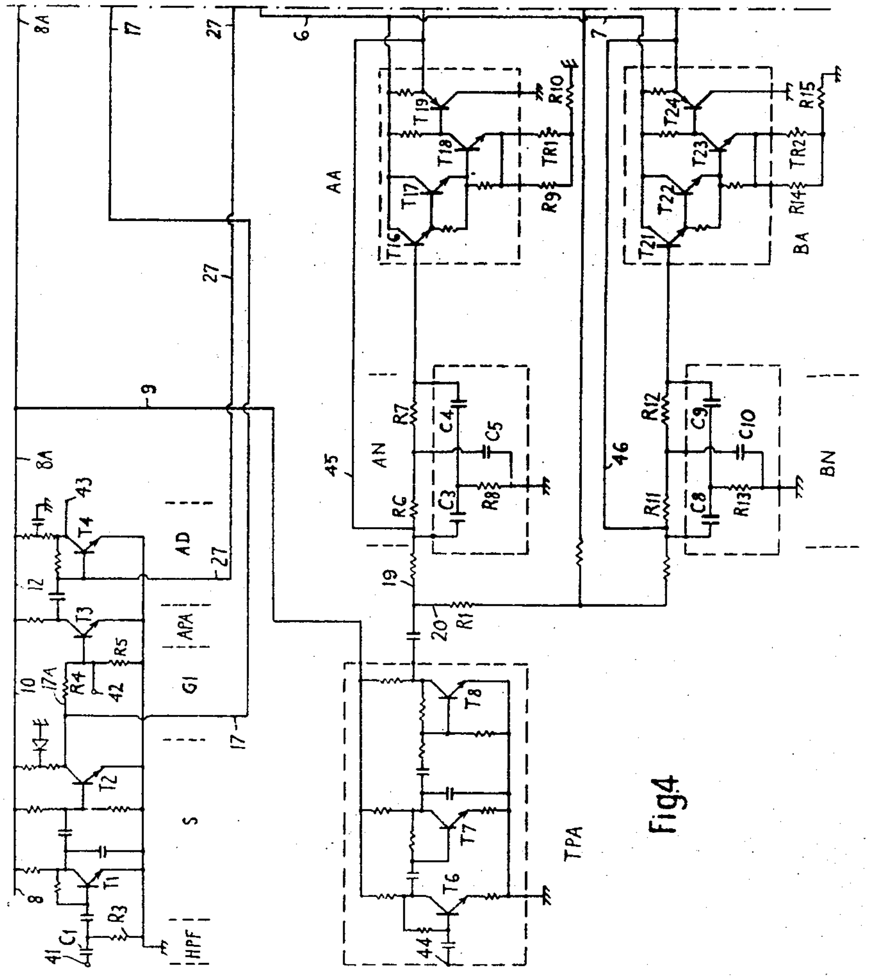

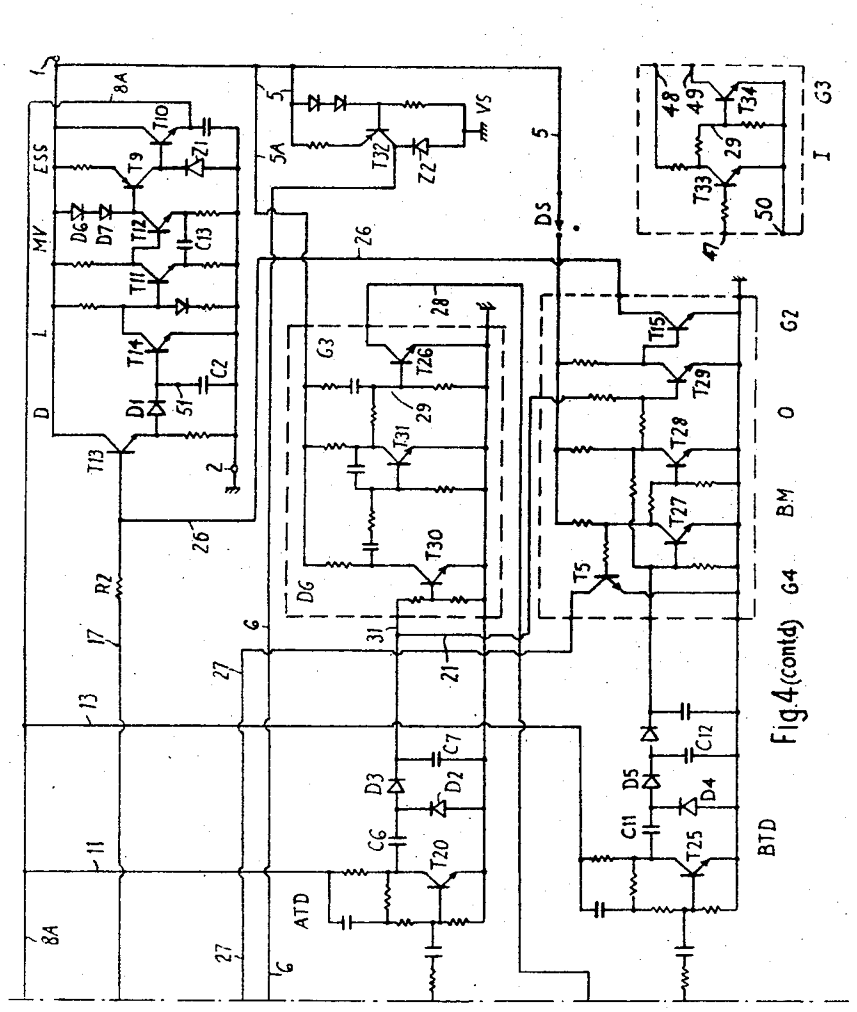
Fig.4 (contd)

BATTERY ECONOMY APPARATUS

This invention relates to apparatus for obtaining reduced power consumption from the direct current supply for a radio receiver in the absence of a signal.

The invention is particularly concerned with battery driven small receivers using an economizer circuit of the type in which the current path from the battery to the major parts of the receiver is periodically switched so that it is interrupted during idle periods of a receiver.

In such economized receivers, as disclosed in U.S. Pat. Nos. 3,488,596 issued Jan. 6, 1970, 3,599,100 issued Aug. 10, 1971, and 3,611,156 issued Oct. 5, 1971, provision is made for a delay in reversion to periodic switching, after cessation of an incoming signal, in order to overcome the possibility of drop-out due to passing through a small area of low field strength caused by, for example, a standing wave pattern set up by reflections of the transmitted signal by buildings.

The provision of selective calling, by a plurality of discrete sequential tones with or without intervals therebetween, whereby only a selected number of the total number of receivers respond to a particular transmission, often requires delays to be incorporated in the decoding circuits of the receiver and also requires that the current path to the major parts of the receiver by uninterruptedly conductive during reception of tones to which a receiver is responsive.

The present invention provides a receiver having an economizer circuit and a decoder for a selective calling system in which the delay in reversion to periodic switching of the economizer circuit is utilized to hold the said current path conductive during reception of the tones of a sequence subsequent to reception of a first tone.

The invention also provides a receiver having an economizer circuit adapted to become fully operative with said economizer switch held in the conducting condition only after reception of a plurality of tones to which the receiver is responsive, in which a control path to the economizer circuit is established during reception of a first of said tones and in which the delay in reversion to periodic switching after the cessation of said first tone is used to allow the uninterrupted passage of a subsequent tone within the receiver, the final tone of the sequence operating switching means to hold the economizer switch in its conductive condition on cessation of said final tone.

In order to obtain maximum immunity to unrequired signals of a frequency adjacent to that of a subsequent tone to which the receiver is responsive it is preferable to include at least one further delay circuit, operated by termination of one tone, to open a path and allow passage within the decoding circuit of a subsequent tone. Preferably the opening of said tone path occurs at a predetermined time after the cessation of the one tone and is of predetermined duration so that a subsequent tone of correct or adjacent frequency beginning and ending either before opening or after reclosure of the path has no effect. The provision of such an additional delay also provides a facility for selective calling by means of the relative timing between one tone and a subsequent tone.

Figure 1:
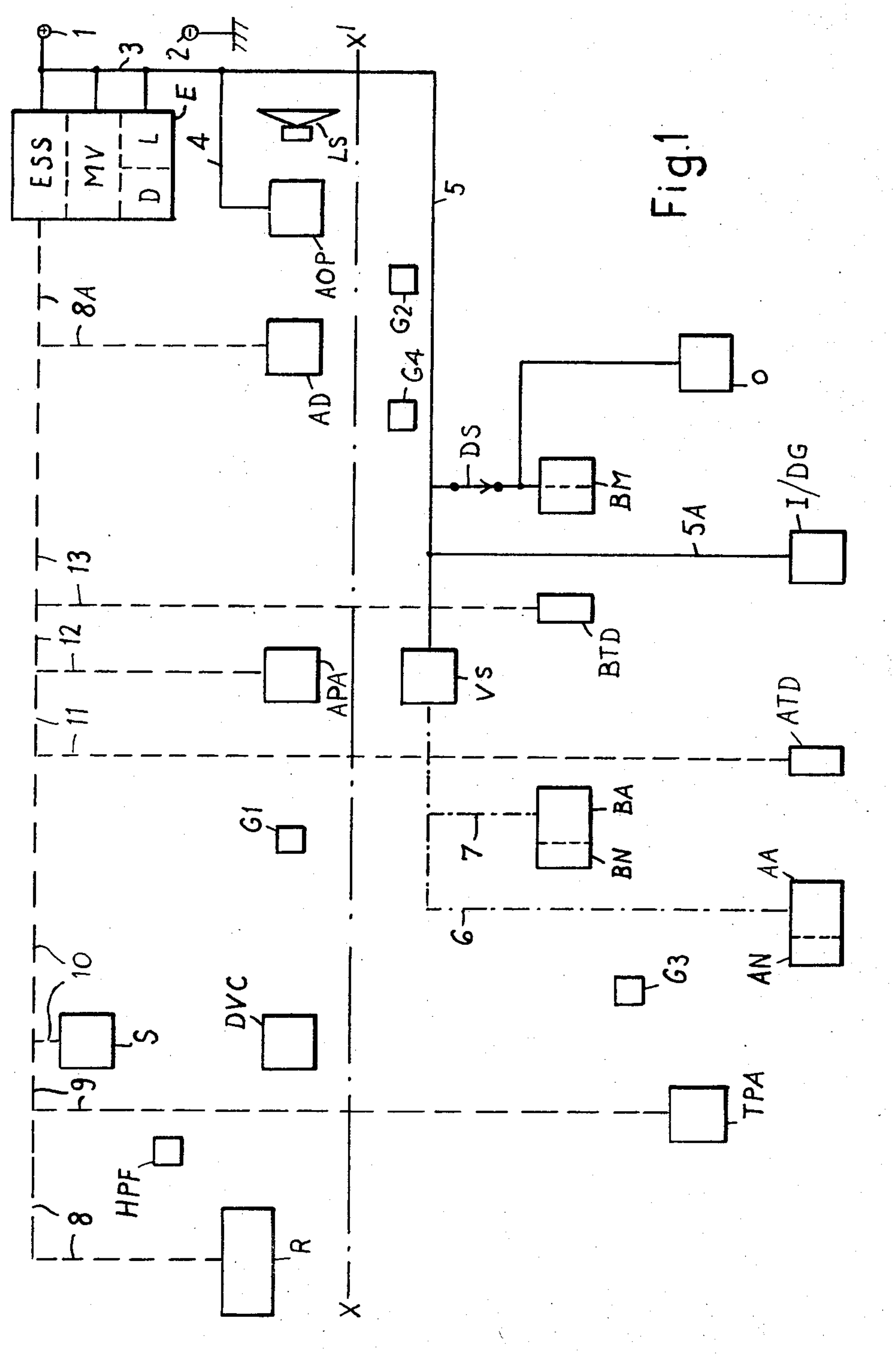
Figure 2:
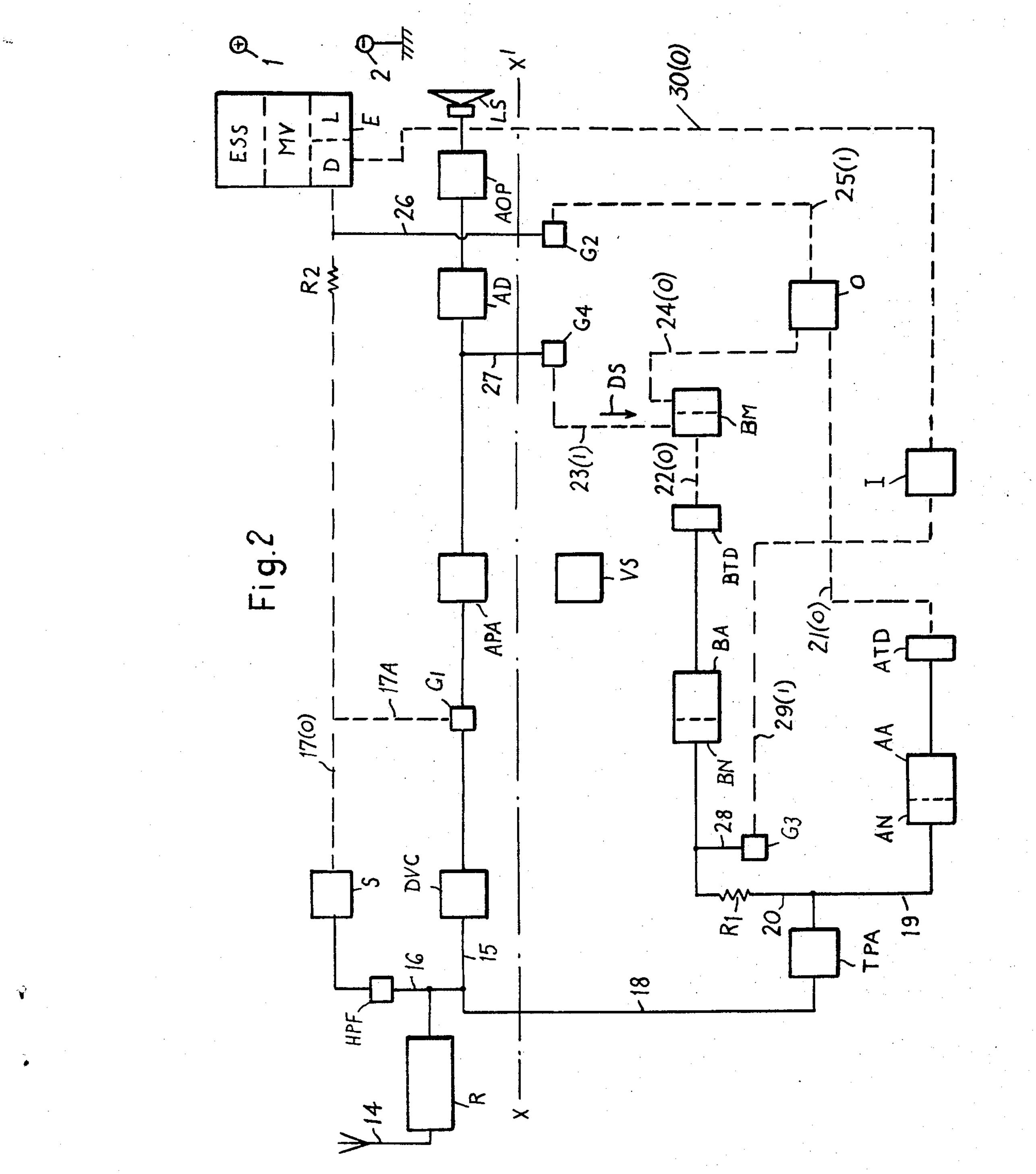
Figure 3:
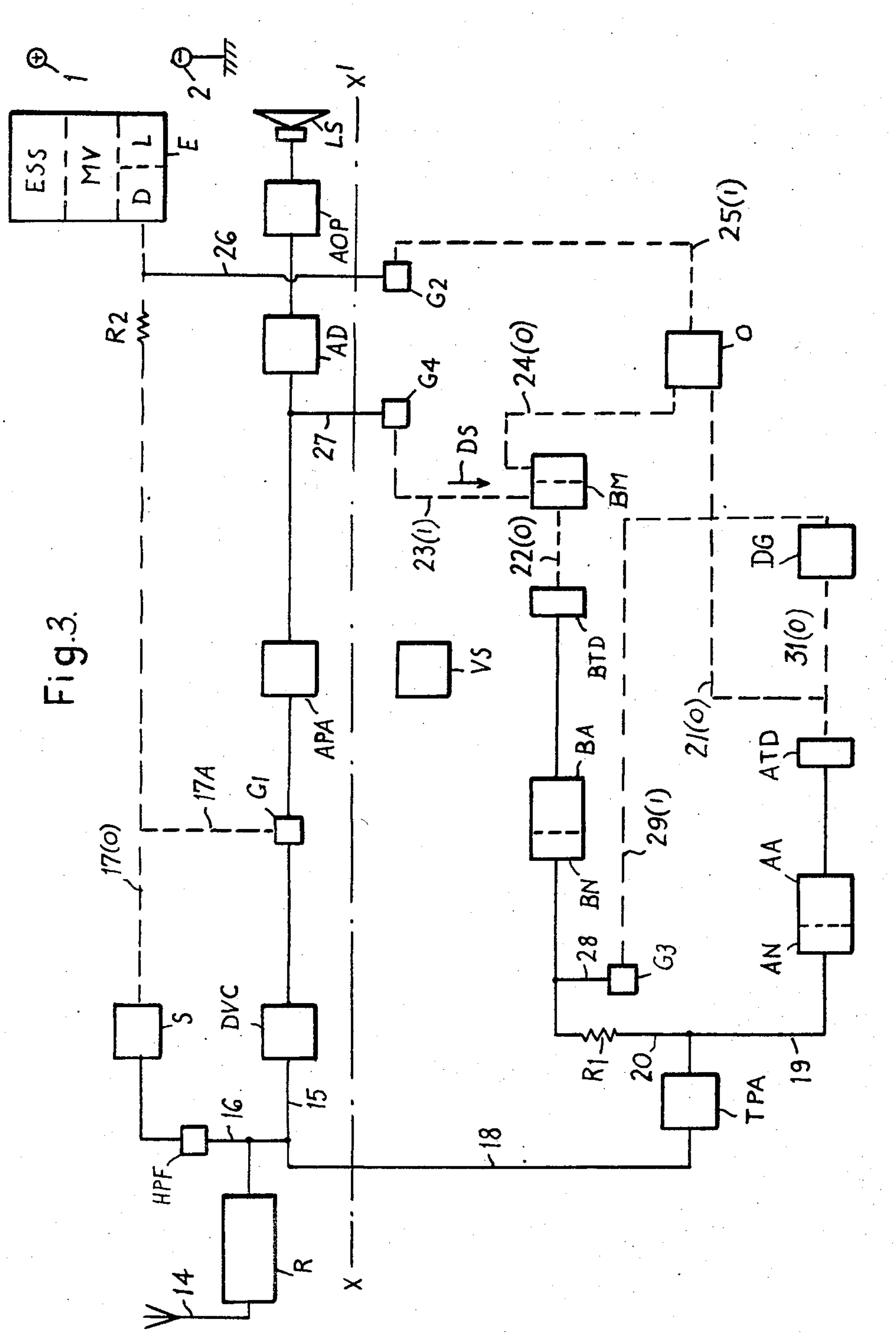
Figure 5:
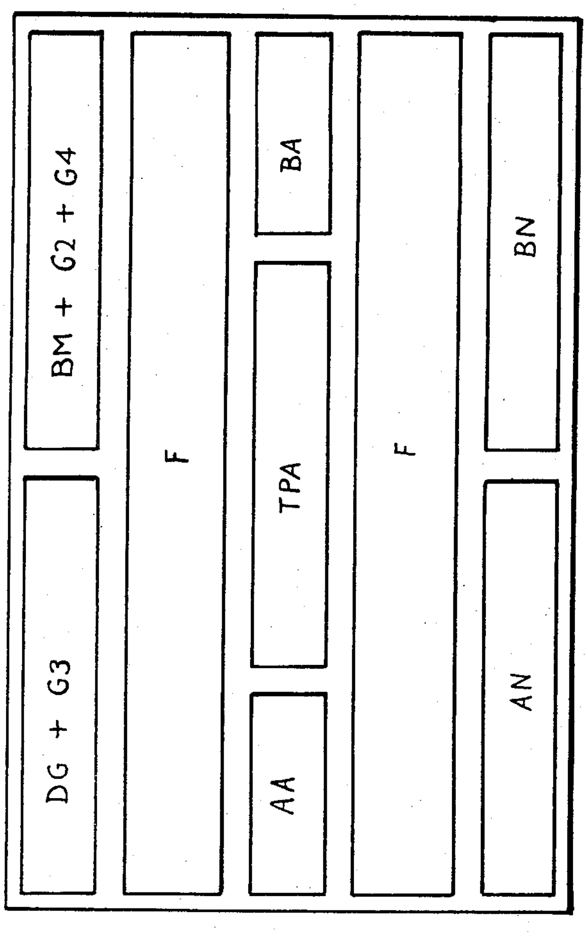

The invention will now be further described, by way of example, with reference to the accompanying drawings, in which:

FIG. 1, is a block diagram of one embodiment of receiver utilizing two sequential tones for selective calling and showing the power supply connections, FIG. 2, is a block diagram of the receiver of FIG. 1 employing only the economizer delay and showing radio frequency and audio frequency signal paths, together with paths for DC control signals derived from the audio signals, FIG. 3, shows the same paths as FIG. 2 for a receiver employing an additional delay, FIG. 4, shows the circuit diagram of some parts of the receiver of FIG. 3, and FIG. 5, is a plan showing the space allocation for the selective call parts of the receiver of FIGS. 1 and 3.

The receiver illustrated in the drawings is one incorporating the economizer circuit of U.S. Pat. No. 3,599,100. The provision of a stabilized supply line of lower than battery voltage enables a number of relatively bulky decoupling components, e.g. capacitors, to be discarded and this, together with a re-arrangement of the low frequency components to give a greater packing density, provides space within the receiver case for the units and components of the selective call circuit. The space so obtained is small, namely an area of the order of 1½ square inches within the depth of the case, and to accommodate the selective call parts therein necessitates the employment of encapsulated thick films and ceramic chips carrying discrete components. The reduction in the supply voltage to the parts of the receiver supplied by the stabilized line also produced a drop in current consumption which offset the additional consumption of the selective call circuit so that there was no overall increase in current consumption.

In FIGS. 1 to 3 the various parts of a selective call receiver are designated as listed below, the parts above line XX' comprising the receiver and those below this line comprising the selective call circuits. Where applicable the same references are used in each figure.

| | |
|---|---|
| R | The input stages of the receiver including all normal RF, Mixer, Oscillator, IF and discriminator stages. |
| HPF | High pass filter |
| S | Squelch gate |
| DVC | De-emphasis and Volume Control |
| APA | Audio Pre-Amplifier |
| AD | Audio Driver Stage |
| AOP | Audio Output Stage |
| LS | Loudspeaker |
| VS | Voltage Stabilizer |
| TPA | Tone Pre-amplifier and Limiter |
| AN | "A" tone Frequency Selective Network |
| AA | "A" tone Amplifier |
| ATD | "A" Tone Detector |
| I | Inverter |
| DG | Delay Gate |
| BN | "B" Tone Frequency Selective Network |
| BA | "B" Tone Amplifier |
| BTD | "B" Tone Detector |
| BM | Bistable Memory |
| O | OR Gate |
| DS | Defeat Switch |
| E | Economizer |
| ESS | Electronic switch and stabilizer |
| MV | Multivibrator |
| L | Lock or clamp |
| D | Delay (in reversion to periodic switching) |
| G1–4 | Inhibitors or gates |

Referring to FIG. 1, the receiver battery is connected via a main ON/OFF switch, not shown, to a positive terminal 1 and a negative terminal 2, the latter providing a zero potential or earth point to which all DC power circuits are returned. The positive supply line 3 supplies current to the economizer E comprising, as in U.S. Pat. No. 3,599,100 an electronic switch and stabilizer ESS driven, as in that application by a multivibrator MV, and a lock or clamp L which can hold the switch closed under the influence of a control signal applied to a delay unit D which provides a delay of some 4 seconds in reversion to periodic switching on cessation of the control signal. The positive supply also supplies current via line 4 to the audio output stage AOP and, via line 5, to a voltage stabilizer VS and to bistable memory unit BM and OR gate 0 through a spring closed "Defeat" switch DS. Prior to the presence of a correct selective call signal, current delivered by line 4 is very small as the output stage AOP operates in Class B. Current in line 5 is also small as the stabilizer VS only supplies the two tone amplifiers AA and BA, of low demand, via the respective lines 6 and 7 (shown chain dotted), and only one low current transistor of the bistable memory BM is operative. Gate 0 is a transistor also non-conducting prior to the presence of a correct tone signal, as are the transistors of unit I/DG supplied via line 5A.

The supply lines carrying interrupted DC in the absence of a correct signal from the electronic switch and stabilizer ESS are indicated by broken lines 8, 9, 10, 11, 12, 13 and 8A in FIG. 1 and respectively feed the receiver input stages R, the tone pre-amplifier TPA, the squelch gate S, the "A" tone detector ATD, the audio pre-amplifier APA, the "B" tone detector BTD and the driver stage AD cut off by inhibitor G4. These units constitute the majority of the current consumption of the receiver and the periodic interruption of their supply provides the desired economy.

In FIGS. 2 and 3 full lines indicate paths carrying RF or AF signals and also the paths whereby gates G2, G3 and G4 are connected in circuit, while broken lines show paths carrying DC control signals controlled by or derived from received signals. The receiver R receives RF signals by an aerial 14 attached to its input and its audio output is passed on a line 15 along the speech chain comprising de-emphasis and volume control stage DVC, inhibitor G1, audio pre-amplifier APA, driver stage AD, output stage AOP to the loudspeaker LS. The audio output is also passed on a line 16 via a high pass filter HPF, which removes the lower audio frequencies used for speech and selective calling, to the squelch gate S which produces a low substantially zero DC voltage indicated by (0) on a control line 17 in the presence of noise and a relatively high DC voltage in its absence. Line 17 is connected via an isolating resistor R2 to the input of the delay D. Additionally the audio output is passed on a line 18 to the tone pre-amplifier and limiter TPA whose output is fed via a line 19 to the "A" tone chain and by a line 20 including a resistor R1 to the "B" tone chain. The "A" chain comprises the selective network AN, amplifier AA and detector ATD and the "B" chain comprises isolating resistor R1, selective network BN, amplifier BA and detector BTD.

The outputs of the tone detectors ATD and BTD, which are zero and indicated by (0) in the absence of correct tones, appear as DC control voltages on lines 21 and 22 respectively, the former providing the first input of OR gate 0 and the latter providing the input for the bistable memory BM whose first output on line 23 is a relatively high DC voltage, indicated by (1) and whose second output is a low, substantially zero DC voltage (0) on a line 24 connected to the second input of OR gate 0.

With both inputs to gate 0 low at (0), its output on line 25 is high at (1) and is applied to the input of gate G2 to provide a low resistance path to earth via line 26 at the input to delay D. Similarly the input to gate G4, provided by line 23 is high at (1) so that gate G4 provides a short circuit to earth via line 27 at the input to the audio driver stage AD. Gate G3 is similar to the previous two gates and provides a short circuit to the input of the "B" tone frequency selective network BN via line 28 when its input on line 29 is high (1) as is the case prior to reception of the correct "A" tone. Gate G1 comprises two serially connected resistors connected via line 17A between line 17 and earth. The junction of the resistors provides forward bias for the transistor comprising pre-amplifier APA so that, in the absence of an incoming signal, with line 17 at (0) the transistor is cut off and inoperative.

The operation of the circuits is as follows:

With no signal received, control voltages are as indicated (0) or (1) in FIGS. 2 and 3, the multivibrator MV is running and the switch ESS provides interrupted DC to the majority of the set, noise in the receiver output holding line 17 at (0). During conduction periods of the switch ESS, the presence of a carrier of correct frequency reduces the noise output and line 17 changes to (1) to open gate G1 and make the pre-amplifier APA operative. Due to the short circuit provided by G2 the economizer continues to run. When the carrier is modulated, such modulation is amplified by amplifier TPA and when the modulation is an "A" tone of correct frequency, i.e., one to which network AN is responsive, this is rectified by the tone detector ATD to change the voltage on line 21 from (0) to (1). Such change results in the output on line 25 from the OR gate 0 changing from (1) to (0) and gate G2 is opened to allow line 17(1) to charge the capacitor of delay D and operate the lock L to hold the switch ESS conducting.

In FIG. 2 the capacitor of delay D is connected via a line 30, at (0) in the absence of input to delay D, to the input of an inverter I, whose output is high (1) on line 29. The charge on the capacitor changes line 30 from (0) to (1) causing line 29 to change from (1) to (0) and open gate G3 to allow passage of signals on line 20. Cessation of the correct "A" tone reverts lines 21 and 25 to (0) and (1) respectively, so removing the input from delay D, which latter then holds gate G3 open for the delay period.

In FIG. 3 the output, (0) in the absence of the correct "A" tone, from tone detector ATD is additionally passed on line 31 to the input of a delay gate DG whose output is normally (1) on line 29 controlling gate G3. The output of gate DG is a pulse, of predetermined length commencing a predetermined time after cessation of the correct "A" tone, which opens gate G3.

In either circuit, if a "B" tone of correct frequency, as determined by the network BN, is received during the period in which gate G3 is open, tone detector BTD will change line 22 from (0) to (1) and the bistable memory BM will change its output on lines 23 and 24 to (0) and (1) respectively. The former opens gate G4 to allow passage of speech to the loudspeaker and the latter, through OR gate 0 re-opens gate G2. Due to the memory BM being bistable this condition will be held after the correct "B" tone has ceased (with switch ESS locked closed or operating depending on the presence or absence of a carrier) until manual operation of defeat switch DS, which when pressed and released causes memory BM to revert to the condition shown and revert the economizer to periodic switching after some 4 seconds.

Should no correct "B" tone be received whilst gate G3 is open, periodic switching is resumed some 4 seconds after cessation of the correct "A" tone.

Although in FIG. 3 there is no control link from delay D, the presence of such a delay is necessary. Without a delay, switch ESS would revert to periodic switching when the "A" tone stopped, and gate G3 could then be open during a period when receiver R, pre-amplifier TPA and detector BTD where inoperative due to removal of their supply. Such a condition is emphasized when, for purposes of interference immunity, the gate G3 is opened only for a period, e.g. 200 milliseconds, long enough to obtain an output on line 22 from a correct tone input on line 20.

In FIG. 4, which includes all units of FIG. 3 with the exception of R, DVC, AOP AND LS, the various units employ the major components and associated circuits listed below:

| Unit | Components | | |
|---|---|---|---|
| HPF | C1 | R3 | |
| S | T1 | T2 | |
| G1 | R4 | R5 | |
| APA | T3 | | |
| AD | T4 | | |
| G4 | T5 | | |
| TPA | T6, | T7 | T8 |
| ESS | T9, | T10 | Z1 (D6 D7) |
| MV | T11 | T12 | C13 (D6 D7) |
| D | T13 | D1 | C2 |
| L | T14 | | |
| G2 | T15 | | |
| AN | R6 | R7 | R8 C3 C4 C5 |
| AA | T16 | T17 | T18 T19 |
| | R9 | R10 | Thermistor TR1 |
| and | T20 | D2 ATD D3 | C6 C7 |
| G3 | T26 or T34 | | |
| BN | R11 | R12 | R13 C8 C9 C10 |
| BA | T21 | T22 | T23 T24 |
| | R14 | R15 | Thermistor TR2 |
| BTD | T25 | D4 | D5 C11 C12 |
| BM | T27 | T28 | |
| O | T29 | | |
| DG or I | T30 | T31 or T33 | |
| VS | T32 | Z2 | |

The input to unit HPF is terminal 41, the output from unit DVC is applied to terminal 42, the output from transistor T4, the audio driver, appears on terminal 43 and the input for transistor T6, the first stage of the tone pre-amplifier TPA is terminal 44. Current feeds to the units and their interconnections have the same references as in FIGS. 1 and 3.

It will be noted that, in FIG. 1, gates G1 to G4 were shown with no current feed thereto. FIG. 4 however, correctly shows that gate G1 receives current from line 10 via line 17A, and that gate G2 is also supplied from line 10 via line 17 and resistor R2. Gate G3 is supplied via line 28 from the inputs to filter networks AN and BN which receive, via the respective feedback connections 45 and 46 from amplifiers AA and BA, current from voltage stabilizer VS by lines 6 and 7. Gate G4 takes collector current from line 8A via line 27 and the base bias, collector load and decoupling resistors of the audio driver transistor T4.

As earlier stated parts of the selective call circuit are encapsulated thick film and ceramic chips and such parts are indicated in FIG. 4 by being surrounded by broken line rectangles.

Capacitors C3, C4 and C5 with resistor R8, forming with resistor R6 and R7 a parallel "T" network comprising the filter AN, are mounted on a ceramic chip and encapsulated to form a readily interchangeable unit pre-adjusted to a particular "A" tone frequency.

Similarly mounted and encapsulated capacitors C8, C9 and C10 with resistor R13, which with resistor R11 and R12 form the parallel "T" network of filter BN, enable easy selection of a required "B" tone frequency.

Individual thick film encapsulated units are the tone pre-amplifier TPA, the majority of tone amplifiers AA and BA. The delay gate DG and gate G3 form another thick film unit as do gates G2, G4 and the bistable memory BM.

As stability of accurate gain is required in amplifiers AA and BA a thermistor, TR1 or TR2, is employed together with shunt and series resistors, R9, R10, or R14, R15. These components are not encapsulated and the resistors are mounted so that they may be readily changed for giving the required gain and temperature control despite the spread of parameters of transistor within the amplifiers.

In FIG. 5, the area which may be occupied by the various units of the selective call system is shown. The drawing is not to scale but the overall area occupied by the units of the system may be about 1 inch and 1½ inches. It will be observed by reference to FIG. 4 that only by adopting such encapsulated units or employing more expensive integrated circuits can the required component packaging density be achieved. In FIG. 5, the portions of the selective call not encapsulated, e.g., the voltage stabilizer VS and the external resistors and thermistors of amplifiers AA and BA, are mounted on printed circuit boards in areas marked F, other areas being coded as in preceding drawings.

Where the circuit of FIG. 2 is employed on inverter I is used and no delay gate DG. To make FIG. 4 applicable to FIG. 2, the unit embracing delay gate DG and gate G3, and all connections thereto, are removed. A thick film encapsulated unit comprising transistors T33 and T34, having terminals 47, 48, 49, 50 is shown in the figure but has no connections thereto. It is made operative in conformity with FIG. 2 by connecting terminal 50 to earth, terminal 47 to a terminal 51 of capacitor C2 (line 30 of FIG. 2), terminal 48 to line 5A and terminal 49 to line 28. When so used the unit I+G3, being encapsulated thick film, may take the place of unit DG +G3 shown in FIG. 5.

I claim:

1. A battery-operated radio receiver including a battery economizer circuit for reducing the consumption of power from the receiver battery in the absence of an incoming signal to the receiver, said economizer circuit comprising switch means connected in the direct current path from the battery to the receiver, means for periodically rendering said switch means alternately conductive and non-conductive, means for maintaining said switch means conductive upon receipt by said radio receiver of an incoming signal to which the receiver is adapted to respond, and a first delay circuit including a capacitor for maintaining said switch means conductive for a period of time after cessation of said incoming signal, said radio receiver including circuit means responsive to a plurality of successively received tones, whereby said first received tone acts to maintain said switch means conductive for the duration of said first tone, and said delay circuit further maintains said switch means conductive after cessation of said first tone for a period during which a second tone can be received subsequent to said first tone, said second tone operating said circuit means to maintain said switch means conductive after cessation of said second tone.

2. A receiver as claimed in claim 1, including at least one further delay circuit operated by termination of the first tone to open a circuit path and allow passage of a second subsequent tone.

3. A receiver as claimed in claim 2, wherein the opening of said tone circuit path occurs at a predetermined time after the cessation of the first tone and is of predetermined duration so that a second subsequent tone of correct frequency beginning and ending either before opening or after closure of the circuit path has no effect.

4. A receiver as claimed in claim 1, including means for feeding the successively received tones both to a first tone channel and to a second tone channel, and wherein each tone channel comprises a selective network for that tone, an amplifier and a tone detector.

5. A receiver as claimed in claim 4, wherein the output of the tone detector of one tone channel is fed as one input to an OR gate and the output of the other tone detector of the other tone channel is fed to a bistable memory circuit, said bistable memory circuit having a first output fed as a second input to the OR gate.

6. A receiver as claimed in claim 5, including means for applying the output of the OR gate to the input of a second gate and means connecting said second gate to provide a low resistance path at the input to the first delay circuit in the absence of receiving correct tones.

7. A receiver as claimed in claim 6, including a third gate connected to selectively provide a short circuit at the input of the second tone channel and a fourth gate fed from a second output of the bistable memory circuit provides a short circuit in the audio channel.

8. A receiver as claimed in claim 7, wherein a receiver carrier modulated with a tone of a correct frequency is rectified by the tone detector of one of the tone detector channels thereby changing the state of the OR gate and opening the second gate to charge the capacitor of the first delay circuit and hold the switch means conductive.

9. A receiver as claimed in claim 8, wherein the capacitor of the delay circuit is connected via an inverter to open the third gate to allow the passage of signals to the second tone channel.

10. A receiver as claimed in claim 8, wherein the first tone channel feeds the input of a delay gate, which operates a predetermined time after cessation of a first tone to open the third gate to allow the passage of signals to the second tone channel.

11. A receiver as claimed in claim 8, wherein upon receipt of a second tone during the period in which the third gate is open, the bistable memory circuit changes its state and opens the fourth gate to allow passage of audio signals through the audio channel.

12. A receiver as claimed in claim 11, wherein the bistable memory circuit holds the audio circuit open after cessation of the second tone until operation of a manual switch which causes the bistable memory circuit to revert to its initial condition and return the switch means to periodic switching.

13. A receiver as claimed in claim 12, wherein if no second tone is received while the third gate is open, said switch means resumes periodic switching at a short time interval after cessation of the first tone, as determined by said first delay circuit.

* * * * *